United States Patent
Long et al.

(10) Patent No.: US 12,264,730 B1
(45) Date of Patent: Apr. 1, 2025

(54) AUXILIARY DIFFERENTIAL MECHANISM AND WORK VEHICLE SLIP CONTROL SYSTEM HAVING SAME

(71) Applicant: Deere & Company, Moline, IL (US)

(72) Inventors: Randall L. Long, Coffeyville, KS (US); Zachariah E. Albert, Independence, KS (US); Matthew S. Russell, Bartlesville, OK (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/420,389

(22) Filed: Jan. 23, 2024

(51) Int. Cl.
| | |
|---|---|
| *F16H 48/22* | (2006.01) |
| *B60K 17/34* | (2006.01) |
| *B60K 23/08* | (2006.01) |
| *F16D 67/04* | (2006.01) |
| *F16H 48/32* | (2012.01) |

(52) U.S. Cl.
CPC .......... *F16H 48/22* (2013.01); *B60K 17/34* (2013.01); *F16H 48/32* (2013.01); *B60K 23/08* (2013.01); *F16D 67/04* (2013.01)

(58) Field of Classification Search
CPC .......... F16H 48/22; F16H 48/27; F16H 48/32; F16H 2048/364; B60K 17/16–20; B60K 17/34; B60K 23/04; B60K 23/08; B60K 2023/043–046; F16D 67/02–04
See application file for complete search history.

(56) References Cited

U.S. PATENT DOCUMENTS

| | | | | |
|---|---|---|---|---|
| 6,506,138 | B2 * | 1/2003 | Panizzolo | F16D 55/40 475/86 |
| 8,177,673 | B2 * | 5/2012 | Han | B60K 17/046 475/204 |
| 8,382,633 | B2 | 2/2013 | Cooper et al. | |
| 10,316,948 | B2 * | 6/2019 | Valente | F16H 48/24 |
| 10,724,580 | B2 | 7/2020 | Averill et al. | |
| 11,654,900 | B2 | 5/2023 | McKinzie et al. | |
| 11,802,613 | B1 | 10/2023 | Love | |
| 2023/0278421 | A1 * | 9/2023 | Oowada | B60K 17/34 |

\* cited by examiner

*Primary Examiner* — James J Taylor, II
(74) *Attorney, Agent, or Firm* — KLINTWORTH & ROZENBLAT IP LLP (57) ABSTRACT

An auxiliary differential mechanism for a work vehicle includes a housing fixed with respect to the differential, a main shaft extending within the housing along a rotation axis and configured to couple to the differential and rotate about the rotation axis, and a wheel shaft extending along the rotation axis and configured to rotate about the rotation axis to drive the ground-engaging wheel or track. A brake is located between the main shaft and the housing, and a brake piston is configured to selectively engage the brake to ground the main shaft to the housing. A clutch is located between the main shaft and the wheel shaft, and a clutch piston is configured to selectively engage the clutch to tie the wheel shaft to the main shaft to corotate together. An intermediate piston between the brake and the clutch is selectively movable to engage the brake or the clutch.

20 Claims, 8 Drawing Sheets

AUXILIARY DIFFERENTIAL MECHANISM AND WORK VEHICLE SLIP CONTROL SYSTEM HAVING SAME

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to work vehicles and, more specifically, to tractive power differential aspects of work vehicles.

BACKGROUND OF THE DISCLOSURE

Heavy-duty work vehicles, such as those used in the agricultural, construction, forestry, and mining industries, may utilize various drive trains to provide tractive power to the ground-engaging wheels or tracks for work vehicle travel. Some drive trains have final or wheel-end drives, more commonly being electrically powered, to deliver power directly to each wheel or track in a highly controllable manner and thereby improve the overall power distribution and traction of the work vehicle. Other conventional drive trains include front and rear axles with differentials in one, or typically both of the axles, that aid in controlling the power flow to the wheels or tracks. The differentials operate to divide the tractive power flow through the axles when slip arises during travel of the work vehicle. This can occur when changing the heading of (i.e., turning) the work vehicle or when traveling over loose ground (e.g., water, ice, mud, sand, loose gravel, etc.). The differentials operate to transfer power to the non-slipping wheels and thereby better allocate power to improve or restore work vehicle traction. Locking the differentials distributes power equally to both wheels or tracks coupled to the axle, which may be desirable in certain conditions (e.g., when both wheels of the axle travel over loose ground).

SUMMARY OF THE DISCLOSURE

The disclosure provides an auxiliary differential mechanism and a slip control system for a work vehicle having one or more auxiliary differential mechanisms.

In particular, the disclosure provides an auxiliary differential mechanism for a work vehicle, with a differential and a ground-engaging wheel or track. The auxiliary differential mechanism includes a housing fixed with respect to the differential. A main shaft extends within the housing along a rotation axis and is configured to couple to the differential and rotate about the rotation axis. A wheel shaft extends along the rotation axis and is configured to rotate about the rotation axis to drive the ground-engaging wheel or track. A brake is located between the main shaft and the housing, and a brake piston is configured to selectively engage the brake to ground the main shaft to the housing. A clutch is located between the main shaft and the wheel shaft, and a clutch piston is configured to selectively engage the clutch to tie the wheel shaft to the main shaft to corotate together. An intermediate piston between the brake and the clutch is selectively movable to engage the brake or the clutch.

In one or more other aspects or embodiments, the disclosure provides an auxiliary differential mechanism in which the brake is a friction pack including interleaved disks some of the disks being splined to the housing and some of the disks being splined to the main shaft. The brake piston, the intermediate piston, or both the brake piston and the intermediate piston may engage the friction pack to ground the main shaft to the housing. The auxiliary differential mechanism may also be configured such that the clutch is a friction pack including interleaved disks, some of the disks being splined to the wheel shaft and some of the disks being splined to the main shaft. The clutch piston, the intermediate piston, or both the clutch piston and the intermediate piston may engage the friction pack to tie the wheel shaft to the main shaft to corotate together. The wheel shaft may include an annular section in which the clutch is disposed about the main shaft and in which the clutch piston is disposed.

In other aspects or embodiments, the auxiliary differential mechanism may also include a first clutch spring backed by the housing and configured to apply a spring force to bias the intermediate piston toward the clutch and away from the brake. The brake is engaged to ground the main shaft to the housing when the brake piston, the intermediate piston, or both the brake piston and the intermediate piston engage the brake. The brake is disengaged to allow the main shaft to rotate relative to the housing when neither the brake piston nor the intermediate piston engage the brake. A spring retainer may be mounted to the intermediate piston and acted upon by the spring force of the first clutch spring to bias the intermediate piston toward the clutch and away from the brake. A second clutch spring may be disposed within and backed by the wheel shaft and configured to apply a spring force to bias the clutch piston toward the clutch. The clutch is engaged to tie the wheel shaft to the main shaft to corotate together when the both the clutch piston and the intermediate piston engage the clutch. The clutch is disengaged to allow the wheel shaft to rotate freely relative to the main shaft when the intermediate piston overcomes the spring force of the first clutch spring and moves away from the clutch. The intermediate piston may overcome the spring force of the first clutch spring and be moved away from the clutch by hydraulic pressure. A piston stop mounted to the wheel shaft may limit movement of the clutch piston toward the clutch.

In other aspects or embodiments of the auxiliary differential mechanism, the clutch piston is an annular member disposed about the wheel shaft and the intermediate piston is an annular member disposed about the main shaft. The clutch may be engaged by the clutch piston by spring force, and the brake may be engaged by the brake piston, the intermediate piston, or both by hydraulic pressure.

In other aspects or embodiments, the auxiliary differential mechanism may further include a differential locking clutch configured to selectively tie the main shaft to a rotating member of the differential to corotate together. The brake may be selectively engageable by the brake piston, the intermediate piston, or both the brake piston and the intermediate piston. The clutch may be engageable by the clutch piston and selectively engageable by the intermediate piston to effect different modes of operation. The modes include: an unlocked drive mode in which the differential locking clutch is disengaged and the clutch is engaged; a locked drive mode in which the differential locking clutch and the clutch are engaged; an anti-slip modulation mode in which the differential locking clutch is disengaged and either the brake is modulated and the clutch is engaged, the clutch is modulated, or both the brake and the clutch are modulated; a partial free wheel drive mode in which the brake is engaged and the clutch is disengaged, and a partial free wheel brake mode in which the differential locking clutch is engaged and the brake is engaged and the clutch is disengaged. To brake the work vehicle, the brake is engaged during the unlocked drive mode and the locked drive mode, and the differential locking clutch is engaged during the partial free wheel brake mode.

In another aspect, the disclosure provides a slip control system for a work vehicle having an axle mounting ground-engaging wheels or tracks and having a differential. The slip control system includes an auxiliary differential mechanism coupled to the differential and one of the ground-engaging wheels or tracks. The auxiliary differential mechanism includes a main shaft extending along a rotation axis and configured to couple to the differential to rotate about the rotation axis. A wheel shaft extends along the rotation axis and is configured to rotate about the rotation axis to drive the ground-engaging wheel or track. A brake is located between the main shaft and the housing, and a brake piston is configured to selectively engage the brake to ground the main shaft. A clutch is located between the main shaft and the wheel shaft, and a clutch piston is configured to selectively engage the clutch to tie the wheel shaft to the main shaft to corotate together. An intermediate piston between the brake and the clutch is selectively movable to engage the brake or the clutch. The slip control system includes a controller having processing and memory architecture configured to execute control logic to control the auxiliary differential mechanism to effect different modes of operation, including: an anti-slip modulation mode in which either the brake is modulated and the clutch is engaged, the clutch is modulated, or both the brake and the clutch are modulated; and a partial free wheel drive mode in which the brake is engaged and the clutch is disengaged.

One or more of the additional aspects or embodiments of the auxiliary differential mechanism and control logic stated above may be incorporated into the slip control system.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed auxiliary differential mechanism and slip control system, as shown in the accompanying figures of the drawings described briefly above. Various modifications to the example embodiments may be contemplated by one of skill in the art. Discussion herein focuses on the auxiliary differential mechanism and slip control system for a work vehicle, such as a wheel loader. However, it should be understood that they may be utilized in other contexts, including other work vehicle platforms in the agriculture, construction, forestry, mining, and other industries.

Overview

Conventional drivelines for off-road and other heavy-duty work vehicles may have large axle assemblies that deliver rotational tractive power to pairs of forward and rearward wheels or track assemblies. Other conventional work vehicles, especially more modern work vehicles with partially or fully electrified power trains, may have dedicated end drive units, sometimes referred to as "final" drives, that are located at each individual wheel or track assembly to provide it with rotational tractive power directly. The individual end drive units provide enhanced control of work vehicle traction by allowing power to be delivered to each wheel or track assembly independently. This enhanced power resolution may come at the cost of added complexity and expense to the work vehicle. This is especially the case when converting axled work vehicles to this type of drivetrain technology.

The present disclosure allows for the enhancement of tractive power resolution by mimicking end drive unit functionality in conventional axle technology. The present disclosure provides this functionality by augmenting the differential of each axle with one or more auxiliary differential mechanisms. Thus, the present disclosure provides an auxiliary differential mechanism, and a wheel control system, more specifically, a slip control system, that cooperates with or incorporates a primary differential in the context of a conventional axle drive of a work vehicle. An auxiliary drive mechanism may be disposed and operatively connected in this manner between the differential and each ground-engaging wheel or track of the axle to provide an enhanced all-wheel tractive power resolution in a conventional axle drive work vehicle. The axle differential may be locked or open. When the axle differential is locked, the tractive power flow path variations would be provided only by the auxiliary drive mechanisms. When the axle differential is opened it may operate as a primary tractive power flow control mechanism to reduce unwanted slip and compensate for speed variances in opposing wheels or tracks during turns.

Certain aspects of the disclosure provide an auxiliary differential mechanism (hereinafter "ADM") for a work vehicle in which a housing is fixed with respect to the primary axle differential (hereinafter "PAD"). The ADM includes a main shaft that couples to the PAD and a wheel shaft that couples to the ground-engaging wheel or track of the work vehicle. A first clutch (e.g., a brake) is located between the main shaft and the housing, and a second clutch is located between the main shaft and the wheel shaft. A first piston selectively engages the first clutch to ground the main shaft to the housing. A second piston selectively engages the second clutch to tie the wheel shaft to the main shaft to corotate together. An intermediate piston between the brake and the clutch selectively engages the first clutch or the second clutch. In some cases, the intermediate piston may be selectively shuttled into engagement with the opposing clutches under hydraulic or hydraulic and mechanical (e.g., using a return spring) control.

The first clutch may be considered a brake and both clutches are friction packs with interleaved disks, some of the disks of the brake being are splined to the housing and some splined to the main shaft, and some of the disks of the clutch are splined to the wheel shaft and some splined to the main shaft. The brake piston, the intermediate piston, or both the brake piston and the intermediate piston engage the brake pack to ground the main shaft to the housing. The clutch piston, the intermediate piston, or both the clutch piston and the intermediate piston engage the clutch pack to tie the wheel shaft to the main shaft to corotate together. A first clutch spring backed by the housing may apply a spring force to bias the intermediate piston toward the clutch and away from the brake. The brake is engaged to ground the main shaft to the housing when the brake piston, the intermediate piston, or both the brake piston and the intermediate piston engage the brake. The brake is disengaged to allow the main shaft to rotate relative to the housing when neither the brake piston nor the intermediate piston engage the brake. A spring retainer may be mounted to the intermediate piston and acted upon by the spring force of the first clutch spring to bias the intermediate piston toward the clutch and away from the brake. A second clutch spring may be disposed within and backed by the wheel shaft and configured to apply a spring force to bias the clutch piston toward the clutch. The clutch is engaged to tie the wheel shaft to the main shaft to corotate together when the both the clutch piston and the intermediate piston engage the clutch. The clutch is disengaged to allow the wheel shaft to rotate freely relative to the main shaft when the intermediate piston overcomes the spring force of the first clutch spring and moves away from the clutch. The intermediate piston may overcome the spring force of the first clutch spring and be moved away from the clutch by hydraulic pressure. A piston stop mounted to the wheel shaft may limit movement of the clutch piston toward the clutch. The clutch may be engaged by the clutch piston by spring force, and the brake may be engaged by the brake piston, the intermediate piston, or both by hydraulic pressure.

Certain aspects of the disclosure pertain to the use of ADMs to provide a multi-function (or -mode) drive system in a conventional axle driveline. For example, the drive system may be configured to: couple the differential to the wheel with no braking force, couple the differential to the wheel while applying a slight braking force, or lock the differential while allowing the wheel to rotate freely. In certain configurations, control of a single component (e.g., a piston) may serve to provide the three functions or modes of the ADMs. More specifically, each ADM may a differential locking clutch configured to selectively tie the main shaft to a rotating member of the differential to corotate together. Selective activation of the intermediate piston may effect the different modes of operation. These drive modes include an unlocked drive mode in which the differential locking clutch is disengaged and the clutch is engaged. A second drive mode is a locked drive mode in which the differential locking clutch and the clutch are engaged. And a third drive mode includes an anti-slip modulation mode in which the differential locking clutch is disengaged and either: (i) the brake is modulated and the clutch is engaged, (ii) the clutch is modulated, or (iii) both the brake and the clutch are modulated. A fourth drive mode is a partial free drive wheel mode in which the brake is engaged and the clutch is disengaged. Moreover, the work vehicle may be braked during unlocked and locked brake modes as well as during a partial free wheel brake mode in which the differential locking clutch is engaged.

These and other aspects of the disclosed ADM and slip control system will be better understood with regard to the examples that will now be described.

Example ADM and Slip Control System

Figure 1:
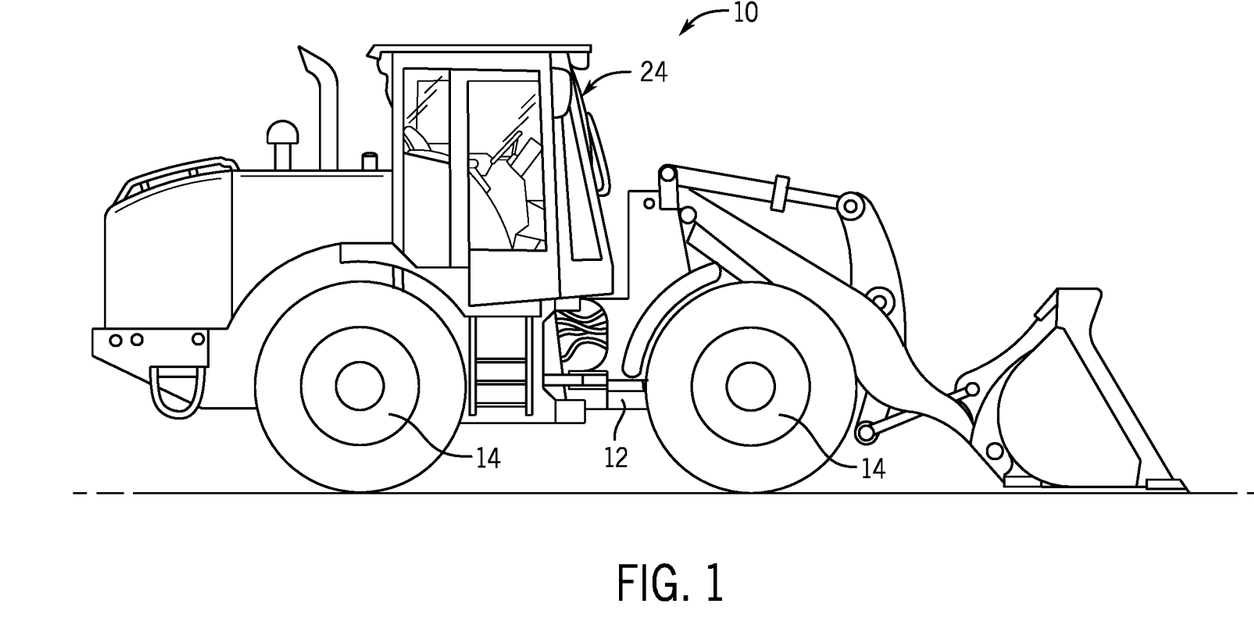
FIG. 1 is an example work vehicle in the form of a wheel loader in which an auxiliary differential mechanism and slip control system of the present disclosure may be incorporated.
Figure 2:
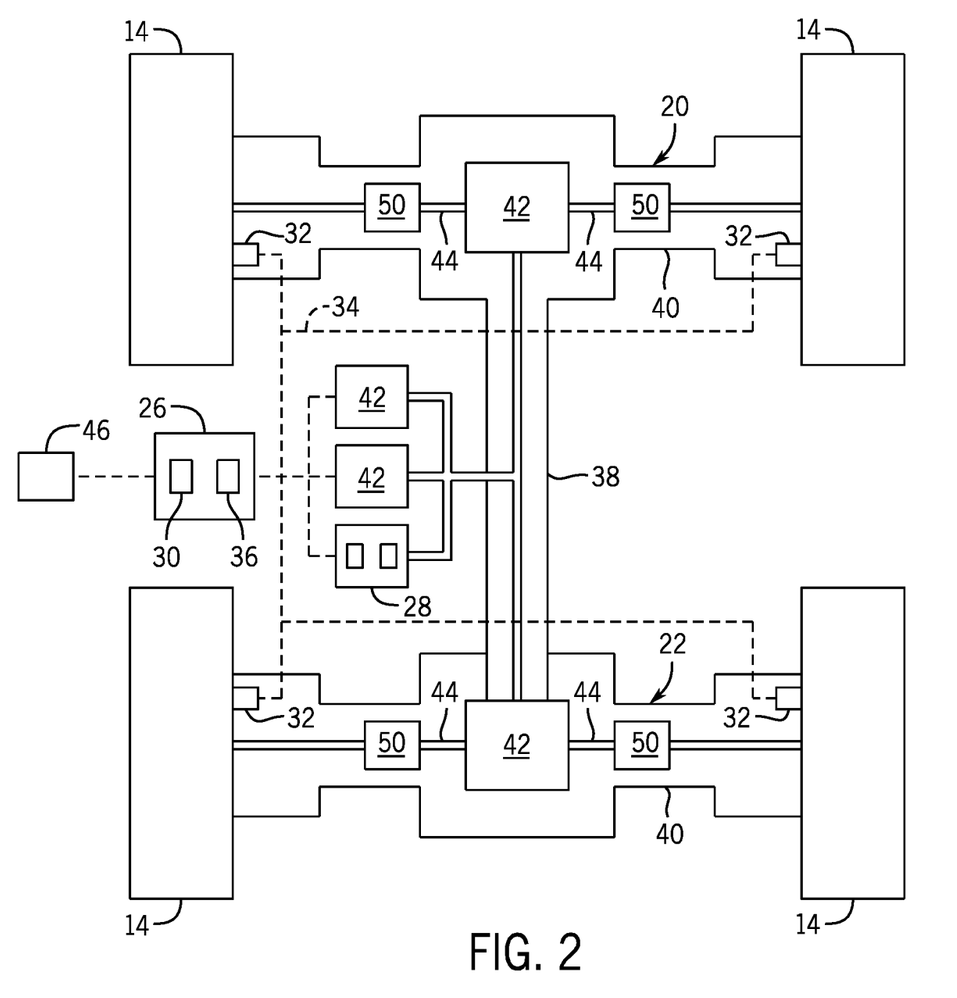
FIG. 2 is a simplified schematic diagram of an example slip control system incorporated in an example drive train of the example work vehicle of FIG. 1.

Referring to FIGS. 1 and 2, a work vehicle 10 may be implemented as a loader or any other heavy-duty work vehicle used in the agricultural, construction, forestry, mining, and other industries. The work vehicle 10 includes a chassis 12 mounting a plurality of ground-engaging members 14, such as wheels or tracks, supporting the chassis 12 off the ground. The chassis 12 carries the power and drive lines of the work vehicle 12 which may include an engine 16 that provides rotational mechanical power to the ground-engaging members 14 through a transmission 18 and front and rear drive axles 20, 22. The chassis 12 also carries an operator cabin 24 to be occupied by an operator of the work vehicle 10. It should be understood that the present disclosure may also pertain to autonomous work vehicles, in which case the operator cabin may be omitted.

The engine 16 may be an internal combustion engine, such as a compression-ignition (e.g., diesel) engine, suitable for providing tractive and operational power to the work vehicle 10. The engine 16 supplies power to the work vehicle 10 either alone or as part of a hybrid power system in which power from the engine 16 is supplemented or replaced during certain operational modes by one or more electric machines, fuel cells or other power sources. It should also be noted that the work vehicle may be a fully electric vehicle in which the engine 16 is omitted and replaced instead by one or more alternative power sources, such electric motors. Rotation of the ground-engaging members 14 may be slowed, in a controlled manner, utilizing a number of brake mechanisms, such as various wet, hydraulically-controlled friction brake mechanisms (not shown) in accordance with operator input (e.g., depression of a brake pedal).

In addition to providing tractive power to propel the work vehicle 10, the engine 16 may provide power to various onboard subsystems, including various electrical and hydraulic components of the work vehicle 10, and for off-boarding power to other sub-systems remote from the work vehicle 10. For example, the engine 16 may provide mechanical power that is converted to an electric format to run electronics of a control system 26 and electric drives of the work vehicle 10. The engine 16 may also provide mechanical power that is converted to hydraulic format to power various pumps and compressors that pressurize fluid to drive various actuators of a hydraulic system 28 in order to power various drives, actuators, steering components, and work implements onboard the work vehicle 10. The hydraulic system 28 may include various components (e.g., valves, flow lines, pistons/cylinders, seals/gaskets, and so on), such that hydraulic control of vehicle devices may be effected.

The control system 26 also includes a processing subsystem 30 and various sensors 32 that may form data connections by signal communication lines 34, which may represent wireless connections, wired connections, or a combination thereof. The sensors 32 can include any number and variety of onboard or remote sensors, including various axle and wheel speed sensors, hydraulic pressure sensors, and other sensors (e.g., temperature, torque, and other sensors) useful in monitoring parameters of the driveline, including those interrogated by the control system 26 in the slip control methodology described below. The processing subsystem 30 may broadly refer to the processing components of the control system 26 that cooperate to carry-out the processing and control functions described herein. The processing subsystem 30 can encompass or may be associated with any practical number of processors (central and graphical processing units), onboard control computers, controllers, navigational equipment pieces, computer-readable memories, power supplies, storage devices, interface cards, and other standardized components.

Additionally, the processing subsystem 30 may include or cooperate with any number of firmware and software programs or computer-readable instructions designed to carry-out any pertinent process tasks, calculations, and control/display functions. The computer-readable instructions executed by the processing subsystem 30 may be stored within a non-volatile sector of a computer-readable memory 36 further included in the control system 26. The computer-readable memory 36 can encompass any number and type of storage media suitable for storing computer-readable code or instructions, as well as other data utilized to support the control system 26 perform its slip control operations. This may include any of various empirical data stores, as well as algorithms, functions, look-up tables, or other data structures utilized to convert units or transform parameters into different parameters. Additionally, in instances in which the control system 26 carries-out certain prescribed actions of the slip control system, the computer-readable instructions stored in the memory 36 may specify the manner in which to perform such actions, such as described below in connection with FIG. 4.

Example structural implementations of certain components of the work vehicle 10 will now be described to provide non-limiting context in which embodiments of the slip control system and method may be better understood. Referring still to FIG. 2, an example implementation of the work vehicle chassis 12 is shown schematically. Although various power and drive line arrangements are envisioned, one example arrangement has the engine 16 imparting mechanical power to the transmission 18 that has an output shaft that drives rotation of the front axle 20. The front axle 20 in turn couples, and transmits rotation, to the rear axle 22 by a driveshaft 38. Various clutches or other mechanical disconnects may be included to mechanically isolate or couple the front axle 20 and the rear axle 22 to operate in various modes (i.e., front only, rear only, or four wheel drive). In other examples, the front and rear axles 20, 22 may be mechanically isolated and include discrete transmissions such that they form transaxles that are mechanically independent but controlled electronically by the control system 26 to operate in various modes.

The front and rear axles 20, 22 may be the same or different and be of any suitable conventional axle construction with structural axle housings containing internal shafts and gearing, such as various axial or planetary gear systems, suitable to transmit rotational power and torque to the ground-engaging members 14 necessary for work vehicle travel. Given their conventional construction, the details of the front and rear axles 20, 22 will not be detailed herein other than to specify the axle housings 40 containing the differentials 42 (hereinafter "primary differentials") having opposing rotating output members 44 (e.g., shafts, housing hubs, etc.) extending from the primary differentials 42 toward opposite (e.g., left and right) ground-engaging members 14. It will also be noted that the primary differentials 42 may be locking differentials, either including internal locking mechanisms or cooperating with components of the ADMs to effect locking, as described below. In either case, the output members 44 may be selectively coupled or fixed for corotation with one another such that both sides of the primary differentials 42 rotate at the same speed and torque, and thereby deliver the same speed and torque to the associated pairs of ground-engaging members 14. Various locking mechanisms may be utilized and controlled by the control system 26, including various electronically or electro-hydraulically controlled locking mechanisms that act to engage and disengage friction clutch components for selectively placing the primary differentials 42 in a locked state. Again, when engaged or locked, the primary differentials 42, alone or in combination with the ADMs, generally equalize the respective rotational rates of the corresponding output members 44. Conversely, when disengaged or unlocked, the primary differentials 42 (and ADMs) permit the output members 44, and therefore the corresponding pairs of ground-engaging members 14, to rotate independently at different speeds. Since the output members 44 and ground engaging members 14 are capable of rotating at disparate speeds, two axle speed sensors 32 may be positioned to monitor the speed of each output member 44 or ground-engaging member 14.

The control system 26 may include any number and type of additional sensors, which are operably coupled to (in signal communication with) the processing subsystem 30, including wheel sensors or sensors for monitoring the speed and/or displacement (if variable) of the hydraulic pump, which can be combined with known parameters (pump displacement) to determine fluidic pump output. Such sensors may be operably coupled to the processing subsystem 30 through a vehicular bus or another data connection onboard the work vehicle 10. The work vehicle 10 is further equipped with other various commonly utilized onboard sensors, such as a global positioning system (GPS) unit for tracking geographical positioning and motion state (e.g., speed and heading vectors) of the work vehicle 10. The other work vehicle sensors may or may not monitor parameters directly applicable to the operation of the slip control system and method. Yet, input from any number and type of vehicle sensors may be considered by the control system 26 in monitoring travel events, implementing appropriate responsive actions, and performing other related functions.

As briefly described above, the processing subsystem 30 of the control system 26 can encompass any number of individual control units or controllers, which are operably interconnected and capable of performing the functions described herein, such as including a number of electronic control units (e.g., engine, transmission, master, etc.), some or all of which may help form the processing subsystem 30. One or more of the electronic control units may receive data from, and transmit data to, various other components onboard the work vehicle 10, including, for example, the GPS unit, the computer-readable memory 36, the onboard sensors 32, a display or input device 46 in the operator cabin 24, and a wireless network interface 48.

The wireless network interface 48 can include a communications circuit or module and an antenna which interfaces with a communications network that broadly encompasses any number and type of networks, systems, or architectures for transmitting data between the work vehicle 10 and a remote operations data center. Accordingly, the communications network can include one or more open content delivery networks, Virtual Private Networks (VPNs), the Internet, cellular networks, and other communications networks implemented in accordance with transmission control protocol/Internet protocol (TCP/IP) architectures or other conventional protocols. In various embodiments, the network 48 may further encompass one or more Local Area Networks (LANs), wide area networks (WANs), controller area networks (CANs), and similar wireless networks. In such instances, the control system 26 may selectively transmit data to the remote operations data center to allow remote diagnostic or prognostic monitoring of the operational conditions of the systems onboard the work vehicle 10.

Additionally or alternatively, visual notifications of slip events, or other visual indicators or recommendations can be generated on the display device 46 onboard the work vehicle 10 (e.g., in the operator cabin 24) or remote from the work vehicle 10 (e.g., on a display located at the remote operations data center or on a personal display device, such as a laptop, tablet, or smartphone). Note that such personal display devices may also be capable of communicating with the data center or the control system 26 over the communications network. In such embodiments, the visual notifications can further be generated on the personal display device in addition to the notifications generated on the in-cabin display 46 and the data center display. Moreover, certain processing tasks may be performed offboard the work vehicle 10, such as at one or more servers associated with the remote operations data center or otherwise in communication with the control system 26 over the network. In other cases, the slip control process steps may be wholly performed by the processing subsystem 30.

Figure 3A:
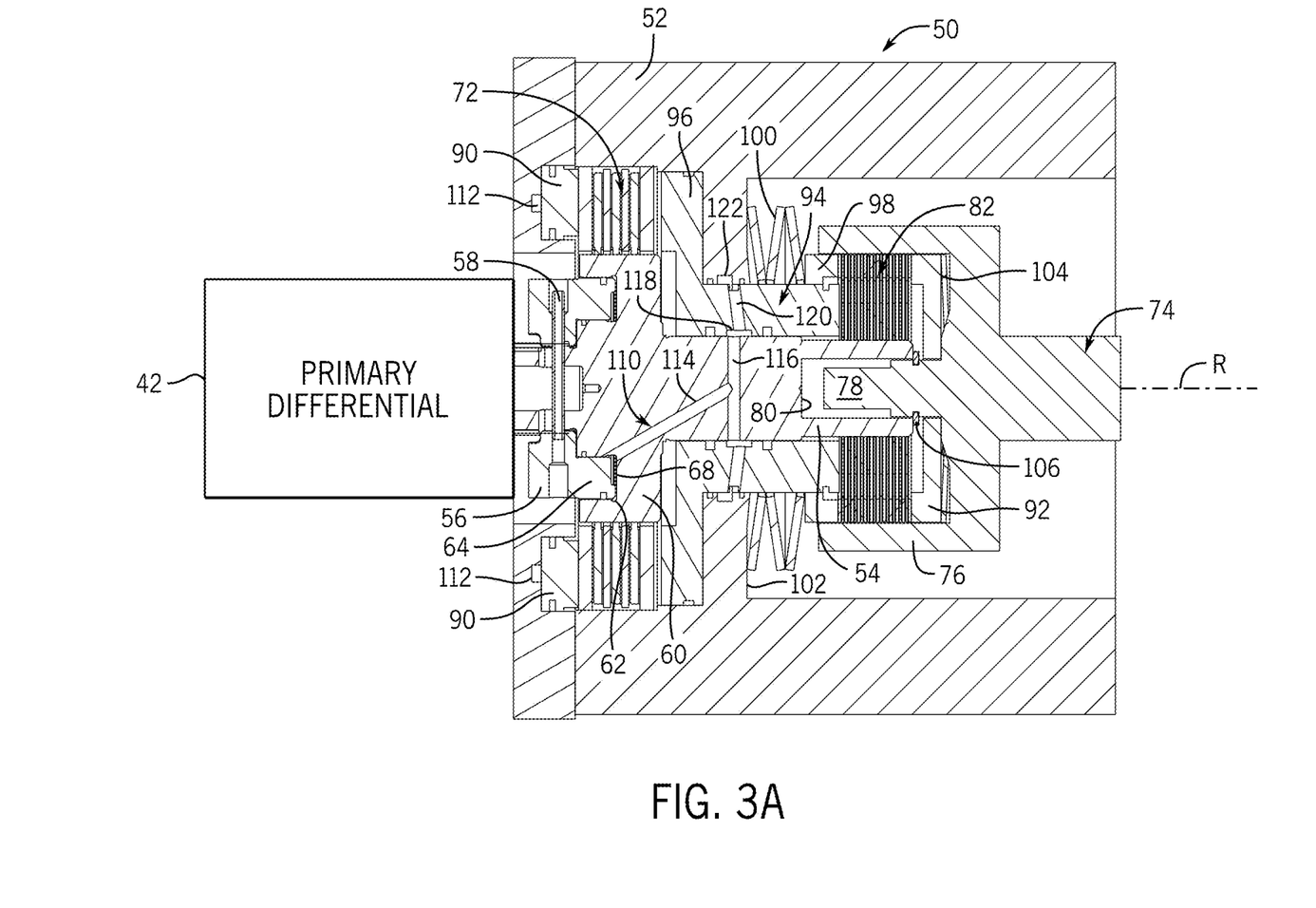
FIGS. 3A-3F are sectional views of an example auxiliary differential mechanism shown in various operational conditions.

The simplified schematic representation shown in FIG. 2 also depicts that the front and rear axles 20, 22 include ADMs 50; specifically, two ADMs 50 are disposed within each axle housing 40 and coupled to the output members 44 of the primary differentials 42, one at each output member 44. It may be possible to effect variants of the slip control system and method with ADMs 50 in just one of the axles 20, 22 or using only a single ADM 50 in each axle 20, 22. Moreover, while the ADMs 50 may be configured differently for each axle 20, 22 or even for multiple ADMs within the same axle, in the illustrated example, each ADM 50 is the same. Turning to the partial schematic cross-sectional view of FIG. 3, an example ADM 50 will now be detailed.

The example ADM 50 includes an ADM housing 52 that can be configured in any manner suitable to fit wholly or partially within the axle housing 40 and be fixed with respect to the primary differential 42 of the axle 20, 22. In the illustrated example, the ADM housing 52 is an assembly of parts, however, it may also be a single monolithic structure. The ADM housing 52 includes an annular housing body and an end plate that may be secured to the housing body and to the axle housing 40 or the primary differential 42 by mechanical fasteners or other mechanical joining techniques (e.g., welding, chemical bonding, and so on). The ADM housing 52 contains the working components of the ADM 50, which include an assembly of shafts, actuators, and clutches. In the illustrated implementation, the ADM 50 has a main shaft 54 extending along and rotating about a rotation axis R.

An inboard end of the main shaft 54 couples to the corresponding output member 44 of the primary differential 42 in any suitable manner so that the corresponding shaft or hub 44 and the main shaft 54 corotate together about the rotation axis R such that power and torque are delivered from the corresponding output member 44 to the main shaft 54. For example, the inboard end of the main shaft 54 may be splined and configured to engage with a splined outboard end of the corresponding output member 44. In various implementations, the splined connection may be a nested connection with the mating shafts coupled together directly without additional separate coupler components, or a separate coupler component may be used to engage and couple the mating splined shaft ends.

In the example implementation, the primary differential 42 and the ADM 50 provide a locking differential. Here, a dog clutch collar 56 splines to the inboard end of the main shaft 54 and is fixed axially by a retaining pin 58 that slides within slots in the collar 56 that are aligned with cylindrical bores in the inboard end of the main shaft 54 into which fits the retaining pin 58 (e.g., by press fit). This arrangement allows the collar 56 to translate along the rotation axis R between engaged and disengaged positions. More specifically, the inboard face of the collar 56 has large teeth or "dogs" (not shown) that can be positioned into and out of engagement with counterpart teeth or dogs on another part of the dog clutch (not shown) that is fixed to the associated output member 44 of the primary differential 42. The engagement and disengagement of the dog clutch may be selectively controlled electro-hydraulically, as described below to provide a "diff lock" control for the work vehicle 10 that ties together the left and right sides of the primary differential 42, and thereby ties together the left and right ground engaging members 14 to corotate as though on a fixed axle.

It should be noted though that the ADMs 50 and at least some of the slip control system and method disclosed herein may be implemented without an active diff lock function and that the ADMs 50 are physically coupled to the output members 44, and are thus part of the power flow path to the ground-engaging members 14, throughout operation of the axles 20, 22. Moreover, in alternative arrangements, the primary differentials 42 may be configured with other limited slip arrangements that activate automatically when a threshold slip, that is a difference in the angular speeds of the side gears (e.g., spider gears) of the primary differential 42 (and thus of the opposite left and right ground-engaging members 14), occurs. This may be achieved using known catch mechanisms (e.g., centrifugal force based catch and pawl mechanisms) that tie together the rotation of the side gears so that equal power and torque are delivered to both shafts or hubs 44. However implemented, internal lockability of the primary differential 42 may provide additional functionality to the slip control system and method.

Referring still to FIG. 3, the inboard end of the main shaft 54 also has an enlarged annular section 60 that defines an annular groove 62 in which fits an annular ring 64 of the collar 56. Radial seals between the annular groove 62 and the annular ring 64 seal off the axial spaces therebetween. The retaining pin 58 retains the collar 56 on the main shaft 54 such that the annular ring 64 creates a pressure chamber 68 that is fed hydraulic fluid by of a network of an internal passages, as detailed below.

The outer periphery of the annular section 60 of the main shaft 54 supports a clutch mechanism, which is referred to herein as ADM brake 72 due to its functional aspects described below. In the example implementation, the ADM brake 72 is a friction pack with interleaved discs, some of which are splined to the outer periphery of the annular section 60 and some of which are splined to the axle housing 40. Alternating ones (e.g., alternating friction discs and disc plates), or all, of the interleaved discs may have frictional material to aid in impeding relative rotation of the discs during engagement of the ADM brake 72. The ADM brake 72 includes inboard and outboard end rings, of thicker, more rigid construction, between which the interleaved discs are sandwiched.

Concentric with the rotation axis R is a wheel shaft 74 that couples to the hub of the ground-engaging member 14. As the wheel shaft 74 may be coupled directly (e.g., physically fixed to) the wheel or track of the ground-engaging member 14 or indirectly (e.g., via a gear set), the outboard connection of the wheel shaft 74 is shown schematically in FIG. 3. The inboard end of the wheel shaft 74 has an enlarged open-ended annular section 76 and a center spindle 78 that fits within an open-ended pocket 80 in the outboard end of the main shaft 54.

Another clutch mechanism, referred to herein as ADM clutch 82, extends between the annular section 76 of the wheel shaft 74 and the outboard end of the main shaft 54. In the example implementation, the ADM clutch 82 is a friction pack with interleaved discs, some of which are splined to the inner periphery of the annular section 76 and some of which are splined to the main shaft 54. Again, alternating ones (e.g., alternating friction discs and disc plates), or all, of the interleaved discs may have frictional material to aid in impeding relative rotation of the discs during engagement of the ADM clutch 82. The quantity and dimensional attributes of the discs comprising the ADM brake 72 and the ADM clutch 82 are depicted as different in the example implementation. Larger diameter and thicker discs may be utilized for the ADM brake 72 to provide braking power sufficient to slow the work vehicle 10. However, the ADM brake 72 and the ADM clutch 82 could have the same number and size discs, or the ADM brake 72 and ADM clutch 82 could have any other suitable number of discs of any suitable diameters, thicknesses and facial configurations.

Operation (i.e., engagement and disengagement) of the ADM brake 72 and the ADM clutch 82 is effected by a plurality of actuators, which in the example implement comprise pistons, namely, a brake piston 90, a clutch piston 92, and an intermediate piston 94 disposed axially between the brake piston 90 and the clutch piston 92. Generally, the brake piston 90 is configured to engage the ADM brake 72 to ground the main shaft 54 to the axle housing 40, the clutch piston 92 is configured to engage the ADM clutch 82 to tie the wheel shaft 74 to the main shaft 54 to corotate together, and the intermediate piston 94 is movable to alternatively engage the ADM brake 72 or the ADM clutch 82.

In the example implementation, the intermediate piston 94 is an annular body or sleeve that fits about the barrel of the main shaft 54 concentric with the rotation axis R and co-rotates therewith. As will be described, the intermediate piston 94 translates along and with respect to the main shaft 54 to engage either the ADM brake 72 or the ADM clutch 82 to be disengage from both the ADM brake 72 and the ADM clutch 82 in a centered condition of the intermediate piston 94. The intermediate piston 94 has an enlarged flanged inboard end 96 sized and configured to act on the ADM brake 72. At its outboard end, the intermediate piston 94 carries an annular spring retainer 98, which may be sized to fit within the inner diameter of the annular section 76 of the wheel shaft 74, and, for example, may be held in place by a snap ring. A spring arrangement 100 (e.g., one or more large diameter annular Belleville springs fit about the outer periphery of the intermediate piston 94) is backed by a narrowed diameter backing wall 102 of the ADM housing 52 and engages the spring retainer 98 at its outboard side. Also inside the annular section 76 of the wheel shaft 74 is the clutch piston 92, which is an annular member activated by another spring arrangement 104 (e.g., one or more large diameter annular Belleville springs fit about the main shaft 54) that is backed by the radial wall of the annular section 76. Travel of the clutch piston 92 along the rotation axis R in the inboard direction may be limited by a stop member 106, such as a snap ring 106 mounted to the main shaft 54.

In this way, the ADM 50 is configured so that the intermediate piston 94 and the clutch piston 92 are ordinarily biased against or to engage the ADM clutch 82 by the springs 100, 104, and thus, the main shaft 54 is normally disposed to transfer power (and torque) to the wheel shaft 74. At the inboard end of the ADM 50, a plurality of pistons (e.g., four pistons arranged equiangularly about the rotation axis R) are disposed and configured to selectively engage the ADM brake 72. While the ADM clutch 82 is primarily spring activated, the brake is hydraulically applied with disengagement provided by venting the brake pistons 90 and return positioning of the intermediate piston 94 effected by the spring 100.

As to the hydraulics, the hydraulic system 28 defines a hydraulic circuit 110 that couples the ADMs 50 to the axles 20, 22, and more specifically, to the primary differentials 42. Through various lines, internal passages, and porting, the hydraulic circuit 110 feeds pressurized hydraulic fluid through the ADM housing 52 and into the pressure sides of the cavities 112 in which the brake pistons 90 are disposed as well as through the intermediate piston 94 and into the pressure chamber 68 of the main shaft 54. The hydraulic circuit 110 defines an oblique passage 114 through the main shaft 54 that intersects the pressure chamber 68 and a radial through passage 116 that opens at the outer periphery of barrel of the main shaft 54. At the inner periphery of the intermediate piston 94 is an annular groove 118 that overlaps the radial through passage 116 in the main shaft 54. The annular groove 118 extends along the rotation axis R to a greater extent so that radial overlap may remain (at least in part) throughout the translational movement of the intermediate piston 94. Since the hydraulic fluid passes between an annular gap or interface between the main shaft 54 and the intermediate piston 94, radial seals are placed to the inboard and outboard sides of the annular groove 118. The annular groove 118 is fed by oblique through-passages 120 passing generally radially through the intermediate piston 94 from openings at the outer periphery thereof. These passages 120 radially overlap an annular groove 122 in the backing wall 102 of the ADM housing 52, again the passages are located and sized to accommodate the translation of the intermediate piston 94 and the transition gap between components is sealed by inboard and outboard radial seals. Additional or other passages and ports may be provided in the components of the ADM 50 to achieve the hydraulic fluid flow path desired to effect the slip control system and method, which will now be discussed in detail.

Figure 3B:
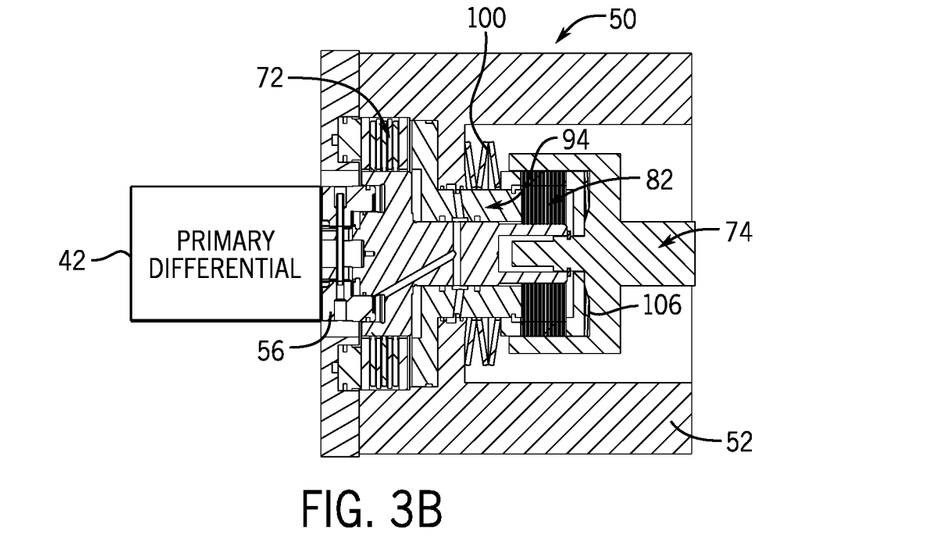
Figure 3C:
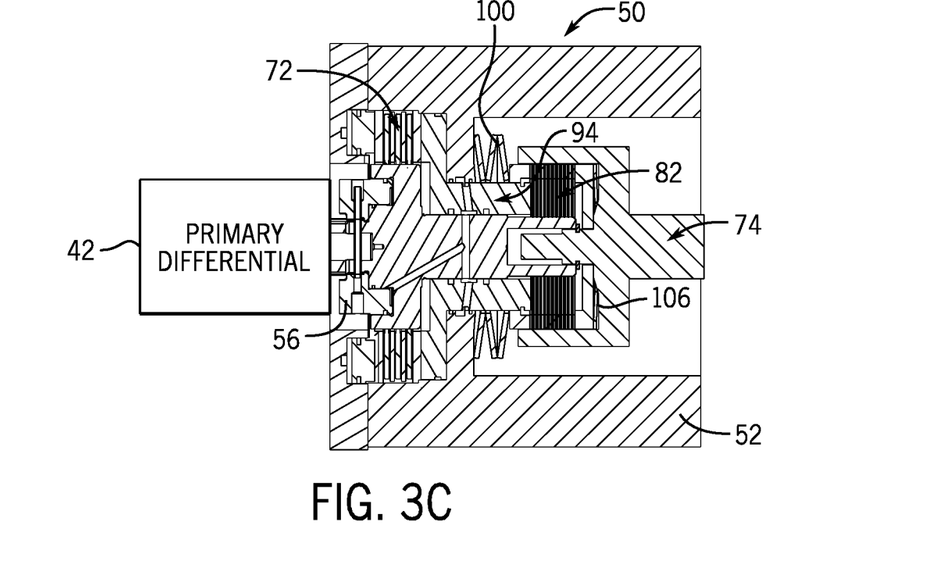
Figure 3D:
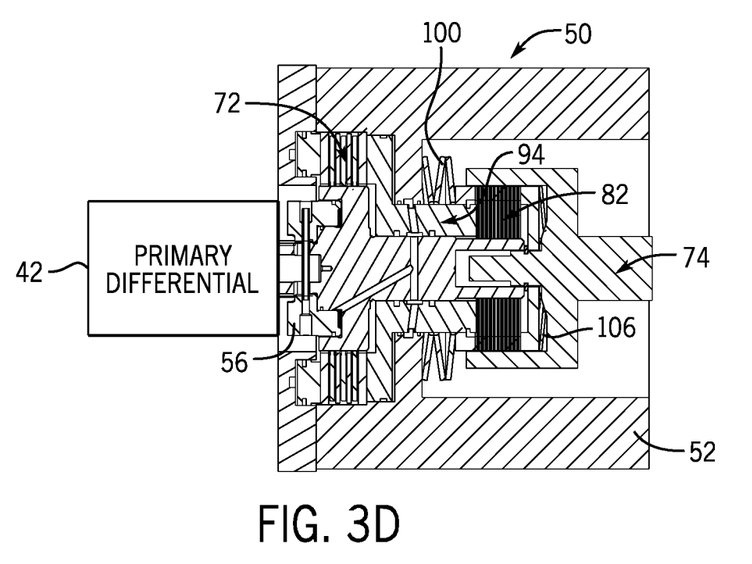
Figure 3E:
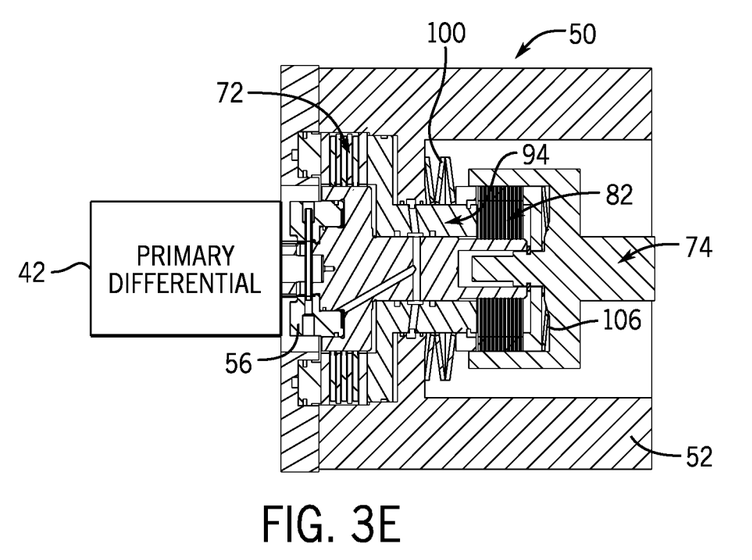
Figure 3F:
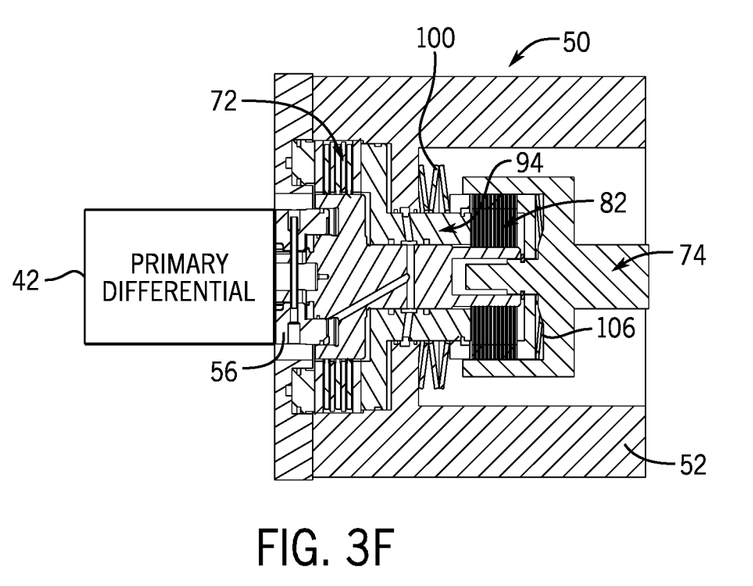
Figure 4:
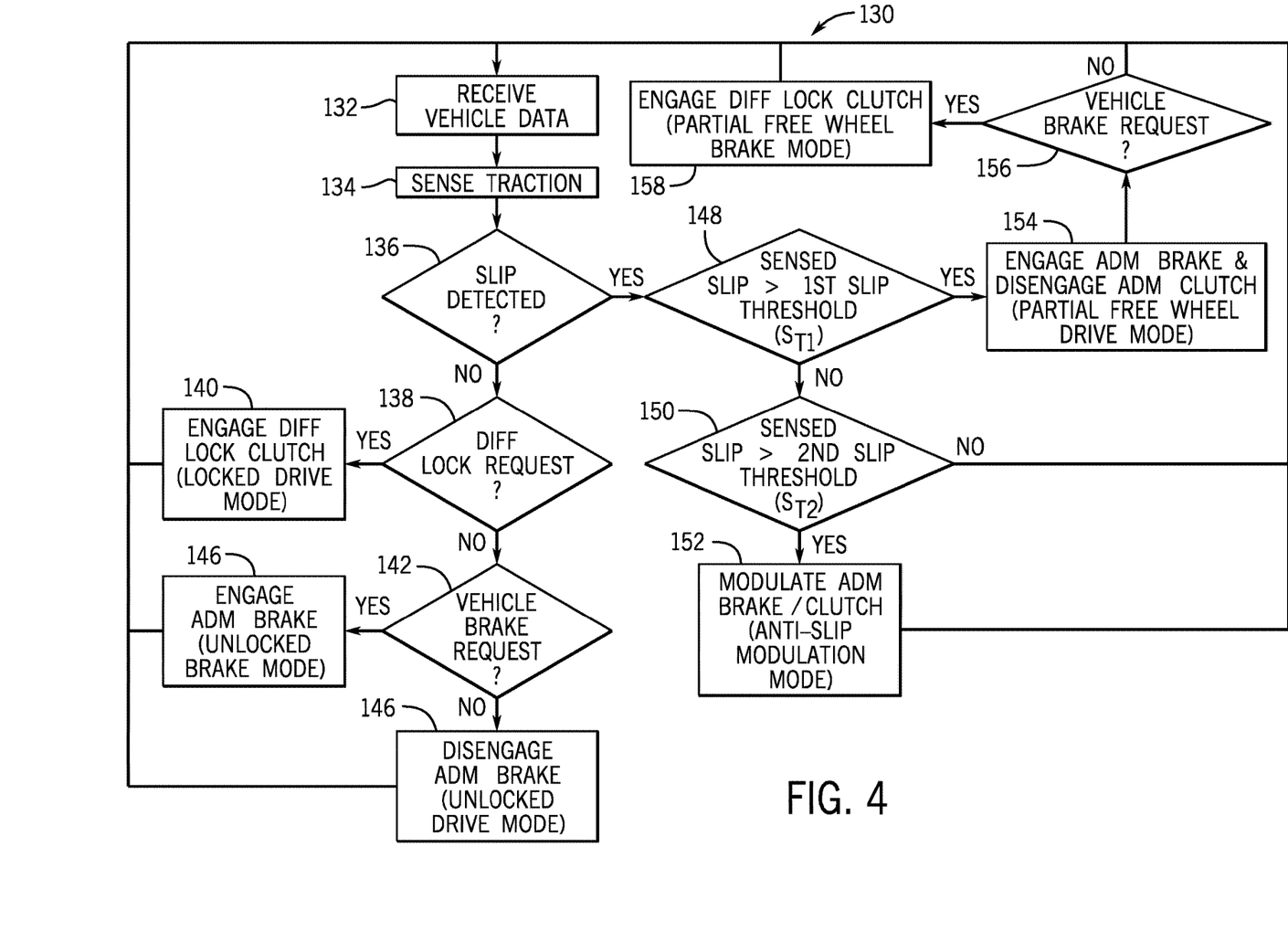
FIG. 4 is an example process flow diagram of the example slip control method.

Referring now also to FIG. 4, an example method 130 of implementing the slip control system will now be described with reference to the various states of the ADM 50 shown in FIGS. 3A-3F. At process block 132, the control system 26 queries or otherwise interrogates the vehicle data, which may include parameters pertinent to aspects of the work vehicle 10 in general, the engine 16, the transmission 18, the axles 20, 22, the ground-engaging members 14, and the hydraulic system 28. Such data may come by the various sensors 32 onboard or offboard the work vehicle 10. By way of example, the control system 26 may obtain data regarding the vehicle speed, engine speed, individual wheel speed, transmission modes, operator control states, and operational states of various pumps and electro-hydraulic valves and actuators of the hydraulic system 28. The control system 26 may also receive data regarding the environmental conditions in which the work vehicle 10 is operating, including various sensed data (e.g., moisture, temperature, location (GPS), optical data, etc.) pertaining to the ground on which the work vehicle 10 is traveling, and specifically, the actual or projected contact area of ground over which each ground-engaging member 14 is or will travel.

At process block 134, the control system 26 will process this data according to instructions, models, algorithms, or other data stored in memory 38 or received remotely to sense, assess, and resolve the traction conditions of each of the ground-engaging members 14. The traction assessment may be an evaluation of the ground. For example, the sensors 32 may include a vision system (e.g., one or more cameras or other optical sensors) that image the ground and feed the control system 26 with data pertaining to the ground conditions encountered by the ground-engaging members 14, such as standing water, mud, loose soil or sand, rocks, undulating or uneven terrain, snow, hardpack ground, aggregate materials, man-made surfaces (e.g., concrete, asphalt) and so on. The sensed ground conditions may then be processed by the control system 26 according to stored or received data to resolve one or more traction values. The traction assessment is in addition to slip detection but may also be based in whole or in part on a slip assessment.

At decision block 136, the method queries whether slip has been detected at the axles 20, 22. The control system 26 will process the data received at process block 132 according to instructions, models, algorithms, or other data stored in memory 38 or received remotely to detect slip. The slip may be determined in various ways and encompass various parameters. For example, the control system 26 may interrogate and resolve an overall axle slip value in which both of the left and right ground-engaging members 14 are considered together to determine relative rotational differences such that a single overall axle slip value is determined. The determined slip may also be a measure of the slip relative to the vehicle speed or wheel traction (or a projected value based on engine speed or transmission mode or sensed ground conditions) for each of the ground-engaging members 14 such that two wheel slip values are determined, one for each left and right wheel.

The method 130 branches depending on the outcome of the slip determination at decision block 136. If no slip is detected, the method 130 proceeds to decision block 138 to determine if the control system 26 has received a diff lock request from the operator or otherwise resolve whether the diff lock function is currently active. If the control system 26 determines that diff lock is requested or active, the method 130 proceeds to process block 140 where the control system 26 queries the state of the diff lock, for example, by assessing the state of the electro-hydraulic control valves controlling the positioning of the differential locking clutch (i.e., whether it is engaged or disengaged from the dog clutch collar 56). If diff lock is activate currently, then the control system 26 does not issue a command, otherwise it commands the hydraulic system 28 to engage the differential locking clutch. The control system 26 may command the hydraulic system 28 (and pumps and electro-hydraulic valves thereof) to supply hydraulic fluid to the pressure chamber 68 in the main shaft 54 to move the dog clutch collar 56 in the inboard direction and engage the locking clutch, such as shown in FIG. 3B. In so doing, the control system 26 effects a locked drive mode so that both ground-engaging members 14 of the axle (either front or rear axle 20, 22) co-rotate together as though on a fixed axle. Afterward, the method may return to process block 132 to repeat the method 130.

If diff lock has not been requested, or is not active, the method proceeds to decision block 142 to assess whether the work vehicle 10 a brake request has been received or whether the work vehicle 10 is currently undergoing a braking operation (e.g., to slow or stop vehicle travel). The control system 26 may interrogate various sensors 32 to execute this step, including sensors associated with one or more operator controls (e.g., engine throttle, transmission mode, brake pedal position, etc.) or other sensors located onboard the work vehicle 10 (e.g., vehicle speed or brake or wheel sensors) or remotely (e.g., aerial or geospatially fixed sensor devices). If the query is affirmative, the control system 26 proceeds to process block 144 and effects an unlocked brake mode during which the control system 26 monitors, facilitates, or effects braking of the work vehicle 10, for example, by actuating the brake pistons 90 to engage the ADM brake 72, as shown in FIG. 3C, and activating any other travel impeding brakes or components that the work vehicle 10 may have. Otherwise, if the query is negative, the control system 26 proceeds to process block 146 and effects an unlocked drive mode in which the ADM 50 is in the state shown in FIG. 3A. The unlocked braking and drive modes may be the normal or default braking and traction modes for travel over hard, dry surfaces. In either of these modes, the control system may return to process block 132 to repeat the method 130.

Returning to the decision block 138, if slip is detected, the method 130 then proceeds to decision block 148 at which the control system 26 analyzes the previously determined slip value or values relative to stored or received theoretical slip values, which may include one or more threshold slip values. In the example implementation of FIG. 4, the control system 26 compares the sensed slip value (here an overall axle slip value) to a first slip threshold ($S_{T1}$), which in this example is also an axle slip value (although it could also be a range of values or one or more wheel slip values or ranges).

At this juncture, if the sensed slip value does not meet or exceed (e.g., is less than) $S_{T1}$, then the method 130 proceeds to decision block 150 in which the sensed slip is analyzed (e.g., compared) to a second slip threshold $S_{T2}$, which is less than $S_{T1}$. Depending upon whether the sensed slip meets or exceeds (e.g., is greater than) $S_{T2}$, the method will either proceed to process block 152 and effect an anti-slip modulation mode or simply return to process block 132 to repeat the method 130.

With sufficient slip sensed (i.e., above $S_{T2}$) at process block 150, the control system 26 initiates the anti-slip modulation mode by modulating the power (and torque) path through the ADM 50, as shown in FIG. 3D. This can be accomplished in one or more of various ways, including by engaging and disengaging (at various rates and durations depending on slip) the ADM brake 72, the ADM clutch 82, or both. As noted above, the control system 26 engages the ADM brake 72 via commands to the hydraulic system 28 to move the brake pistons 90 and the intermediate piston 94 axially toward one another. The control system 26 disengages the ADM clutch 82 via commands to the hydraulic system 28 to move the intermediate piston 94 axially away from the clutch piston 92. In effect, the control system 26 may command the hydraulic system 28 to shuttle the intermediate piston 94 axially back and forth along the rotation axis R between the ADM brake 72 and the ADM clutch 82. This axial translation may seat the intermediate piston 94 against the ADM brake 72 to fully engage it intermittently, while at the same time fully disengaging the intermediate piston 94 from the ADM clutch 82 intermittently. Alternatively, the axial translation may partially engage the ADM brake 72 while partially disengaging the ADM clutch 82. In any case, modulating the associated ADM 50 in this way will intermittently interrupt, and thereby collectively reduce, the power and torque to the slipping ground-engaging member 14, and in so doing, reduce slip. Again, the extent to which the ADM 50 is modulated will depend on the degree to which the ground-engaging member 14 is slipping. The control system 26 may also incorporate the traction assessment from process block 134 here. Specifically, the control system 26 may consider the sensor input associated with the traction evaluation when setting the modulation frequency, amplitude, and/or duration. It should be noted as well that engaging the ADM brake 72 during modulation may also effect a power boost or diversion of power to the opposite side of the primary differential 42 and the associated ADM 50 and ground-engaging member 14. This is due to the activation of the ADM brake 72 and the ratio of the side gears in the primary differential 42. The method 130 can loop back to process block 132 to continue to monitor and mitigate slip until it is below $S_{T2}$.

In the event more extreme slipping is detected (i.e., above $S_{T1}$) at decision blocks 136, 148, the method 130 proceeds to process block 154 and effect a partial free wheel drive mode. In the partial free drive wheel mode, the control system 26 may engage the ADM brake 72 and fully disengage the ADM clutch 82, as shown in FIG. 3E. This may be accomplished by the control system 26 commanding the hydraulic system 28 to move the brake pistons 90 and the intermediate piston 94 axially toward one another. Here, the translation of the intermediate piston 94 is sufficient to fully engage the ADM brake 72 and fully disengage the ADM clutch 82. With the ADM clutch 82 fully disengaged, no power (or torque) is transmitted to the associated ground-engaging member 14 from the primary differential 42, such that it is free to spin about the rotation axis R by gravity, inertia, or other such forces acting on the work vehicle 10. Engaging the ADM brake 72 during operation in the partial free wheel mode avoids drag-causing parasitic losses from being transmitted to the primary differential 42 and opposite ADM 50 and ground-engaging member 14 that may arise from the freely rotating components. For this reason, the method 130 ensures that the ADM brake 72 is engaged during continued disengagement of the ADM clutch 82 in the partial free wheel mode. The method 130 may proceed to decision block 156 to check again for a vehicle brake request, and if none, it can loop back to process block 132 to monitor slip and traction. After the slip has reduced to below $S_{T1}$, and if needed, the method 130 may then again mitigate slip until it is falls below $S_{T2}$ utilizing the anti-slip modulation mode described above.

If vehicle braking was requested or detected at decision block 156, the method may proceed to process block 158 to initiate a partial wheel brake mode that allows vehicle braking to be maintained while one of the ground-engaging members 14 is free-wheeling by locking it to the opposing ground-engaging member 14. This is especially effective when process block 134 determines that the left and right ground-engaging members 14 are encountering different traction conditions. At process block 154, the control system 26 may query the state of the diff lock and command the hydraulic system 28 to engage the differential locking clutch supplying hydraulic fluid to the pressure chamber 68 in the main shaft 54 to move the dog clutch collar 56 in the inboard direction. As shown in FIG. 3F, for the slipping ground-engaging member 14, the ADM brake 72 is engaged and the ADM clutch 82 is disengaged. By engaging the locking differential, the brake from the opposite ground-engaging member 14 may be utilized to slow or stop the work vehicle 10, thereby maintaining braking capabilities during partial free-wheeling. The method 130 can again return to process block 132 to continue to restart the method 130 of monitoring and mitigating slip.

Figure 5:
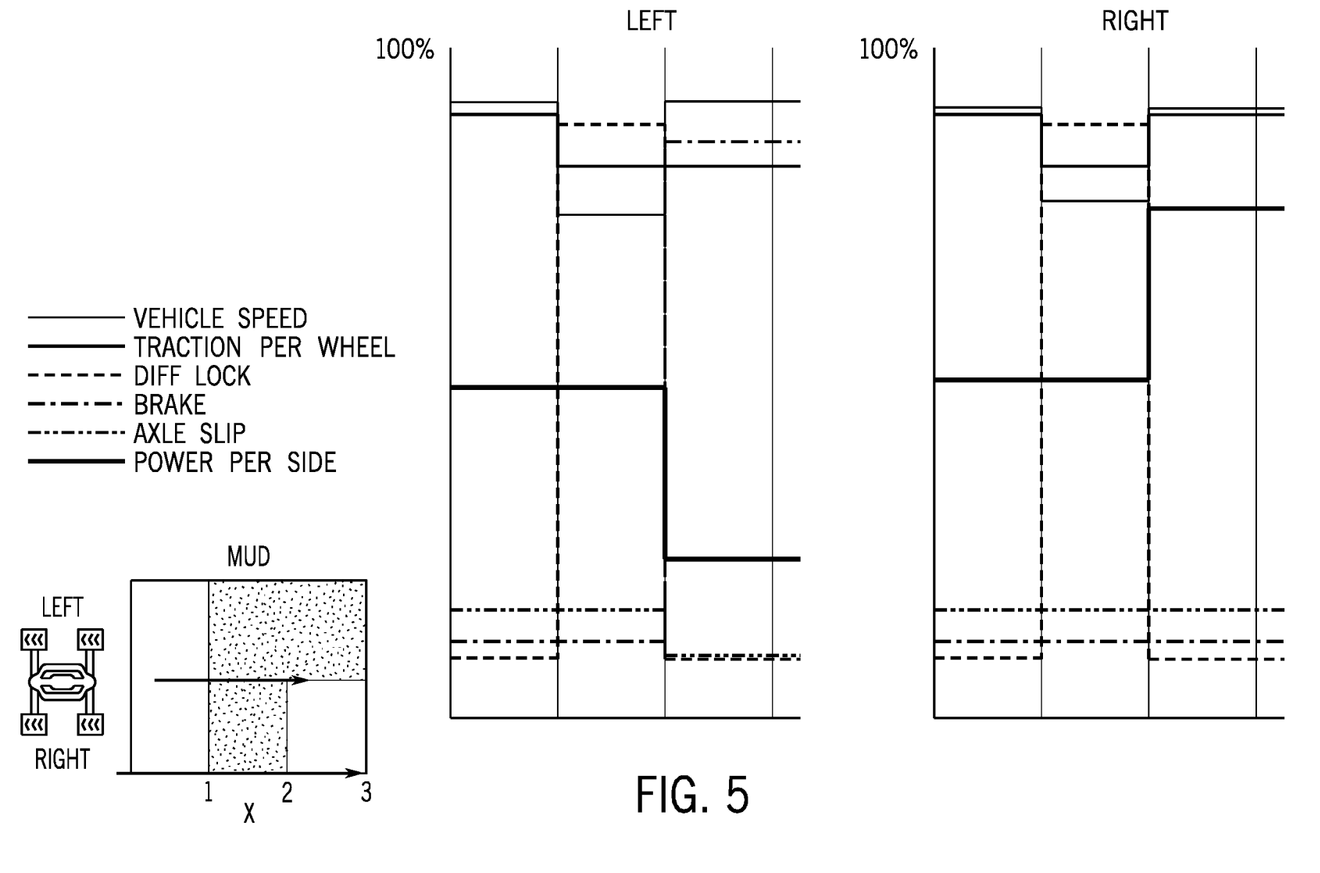
FIG. 5 are example command plots of the example slip control system of FIG. for left and right wheels of the example wheel loader of FIG. 1.

An example application of the above-described implementation of the slip control system and method disclosed herein is provided graphically at FIG. 5. The traction context of the work vehicle 10 in FIG. 5 is depicted in the inset graphic, which shows schematically the left and right wheels of a work vehicle and the three distinct ground contact areas 1, 2, 3. As shown therein, moving from left to right in the graphic, the left and right wheels will both encounter clear flat dry ground in contact area 1 and mud in contact area 2. In contact area 3, however, the left wheel will encounter mud while the right wheel rides on clear flat ground. The traction prospect is thus the same for both left and right wheels in contact areas 1 and 2 and different in contact area 3. Of course, the muddy contact areas present the potential of compromised traction for the wheels tending to cause slip.

The rest of FIG. 5 depicts plots of six parameters, namely the vehicle speed, traction per wheel, diff lock, brake, axle slip, and power per side, for each left and right wheel. Note that in this content the "axle slip" parameter pertains to slip occurring across the axle arising from different relative rotational speeds between left and right wheels, rather than a difference in rotational speed of both wheels from that projected from overall vehicle speed or the like. These plots show that all six parameters are identical for the left and right wheels in contact area 1. Specifically, the diff lock and braking are inactive, there is no appreciable slip, vehicle speed and wheel traction are high (or as desired), and power is split to flow evenly (or at the desired unequal power split) to the left and right wheels. The plots of all six parameters are also the same for the left and right wheels in contact area 2 albeit as compared to the contact area 1 the vehicle speed and traction per wheel has dropped and diff lock has been activated. The power split, braking, and axle slip for both the left and right wheels remains unchanged in contact area 2 from that in contact area 1. In contact area 3, where the traction and/or ground conditions differ for each wheel, the left and right wheel plots now differ. For the left wheel in muddy ground, traction continues at the same level as contact area 2, which was also muddy ground. However, here diff lock is deactivated due to the disparate traction conditions and power and torque has been diverted away from the left wheel by activation of the ADM brake. This has the effect of improving (reducing) axle slip at the left wheel and allowing the work vehicle to increase speed and return to the speed achieved while on the clean flat dry ground of contact area 1. For the right wheel on the clean flat dry ground of contact area 3, five of the six parameters return to the levels of contact area 1 with an increased share of power resulting from the power that was diverted from the left wheel.

FIG. 9 thus depicts that the slip control system and method operates so that both the left and right wheels are in the unlocked drive mode while in contact area 1 and in the locked drive mode while in contact area 2. While in contact area 3, the slip control system is in the anti-slip modulation mode for the left wheel and in the unlocked drive mode for the right wheel. The ADM brake for the left wheel is modulated with the resulting decrease in power and slip and increase in vehicle speed. If the axle slip was more extreme in contact area 3, the system could instead effect the partial free wheel mode in which the plots would be revised to show the power cut to zero for the left wheel and increased further for the right wheel.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The description of the present disclosure has been presented for purposes of illustration and description, but it is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An auxiliary differential mechanism for a work vehicle having a differential and a ground-engaging wheel or track, the auxiliary differential mechanism comprising:
    a housing fixed with respect to the differential;
    a main shaft extending within the housing along a rotation axis and configured to couple to the differential and rotate about the rotation axis;
    a wheel shaft extending along the rotation axis and configured to rotate about the rotation axis to drive the ground-engaging wheel or track;
    a brake between the main shaft and the housing;
    a brake piston configured to selectively engage the brake to ground the main shaft to the housing;
    a clutch between the main shaft and the wheel shaft;
    a clutch piston configured to selectively engage the clutch to tie the wheel shaft to the main shaft to corotate together; and
    an intermediate piston between the brake and the clutch selectively movable to engage the brake or the clutch.

2. The auxiliary differential mechanism of claim 1, wherein the brake is a friction pack including interleaved disks some of the disks being splined to the housing and some of the disks being splined to the main shaft; and
    wherein the brake piston, the intermediate piston, or both the brake piston and the intermediate piston engage the friction pack to ground the main shaft to the housing.

3. The auxiliary differential mechanism of claim 1, wherein the clutch is a friction pack including interleaved disks, some of the disks being splined to the wheel shaft and some of the disks being splined to the main shaft; and
    wherein the clutch piston, the intermediate piston, or both the clutch piston and the intermediate piston engage the friction pack to tie the wheel shaft to the main shaft to corotate together.

4. The auxiliary differential mechanism of claim 3, wherein the wheel shaft includes an annular section in which the clutch is disposed about the main shaft and in which the clutch piston is disposed.

5. The auxiliary differential mechanism of claim 1, further including a first clutch spring backed by the housing and configured to apply a spring force to bias the intermediate piston toward the clutch and away from the brake.

6. The auxiliary differential mechanism of claim 5, wherein the brake is engaged to ground the main shaft to the housing when the brake piston, the intermediate piston, or both the brake piston and the intermediate piston engage the brake, and the brake is disengaged to allow the main shaft to rotate relative to the housing when neither the brake piston nor the intermediate piston engage the brake.

7. The auxiliary differential mechanism of claim 5, further including a spring retainer mounted to the intermediate piston and acted upon by the spring force of the first clutch spring to bias the intermediate piston toward the clutch and away from the brake.

8. The auxiliary differential mechanism of claim 5, further including a second clutch spring disposed within and backed by the wheel shaft and configured to apply a spring force to bias the clutch piston toward the clutch;
    wherein the clutch is engaged to tie the wheel shaft to the main shaft to corotate together when the both the clutch piston and the intermediate piston engage the clutch, and the clutch is disengaged to allow the wheel shaft to rotate freely relative to the main shaft when the intermediate piston overcomes the spring force of the first clutch spring and moves away from the clutch.

9. The auxiliary differential mechanism of claim 8, wherein the intermediate piston overcomes the spring force of the first clutch spring and is moved away from the clutch by hydraulic pressure.

10. The auxiliary differential mechanism of claim 8, further including a piston stop mounted to the wheel shaft to limit movement of the clutch piston toward the clutch.

11. The auxiliary differential mechanism of claim 1, wherein the clutch piston is an annular member disposed about the wheel shaft and the intermediate piston is an annular member disposed about the main shaft.

12. The auxiliary differential mechanism of claim 11, wherein the clutch is engaged by the clutch piston by spring force; and
    wherein the brake is engaged by the brake piston, the intermediate piston, or both by hydraulic pressure.

13. The auxiliary differential mechanism of claim 1, further including a differential locking clutch configured to selectively tie the main shaft to a rotating member of the differential to corotate together;
    wherein the brake is selectively engageable by the brake piston, the intermediate piston, or both the brake piston and the intermediate piston, and wherein the clutch is engageable by the clutch piston and selectively engageable by the intermediate piston to effect different modes of operation, including:
        an unlocked drive mode in which the differential locking clutch is disengaged and the clutch is engaged;
        a locked drive mode in which the differential locking clutch and the clutch are engaged;
        an anti-slip modulation mode in which the differential locking clutch is disengaged and either the brake is modulated and the clutch is engaged, the clutch is modulated, or both the brake and the clutch are modulated; and a partial free drive wheel mode in which the brake is engaged and the clutch is disengaged.

14. The auxiliary differential mechanism of claim 13, wherein to brake the work vehicle:

the brake is engaged during a unlocked brake mode; and the differential locking clutch is engaged during a partial free wheel brake mode in which the differential locking clutch is engaged.

15. A slip control system for a work vehicle having an axle mounting ground-engaging wheels or tracks and having a differential, the slip control system comprising:

an auxiliary differential mechanism coupled to the differential and one of the ground-engaging wheels or tracks, the auxiliary differential mechanism including:

a main shaft extending along a rotation axis and configured to couple to the differential to rotate about the rotation axis;

a wheel shaft extending along the rotation axis and configured to rotate about the rotation axis to drive the ground-engaging wheel or track;

a brake between the main shaft and a housing;

a brake piston configured to selectively engage the brake to ground the main shaft;

a clutch between the main shaft and the wheel shaft;

a clutch piston configured to selectively engage the clutch to tie the wheel shaft to the main shaft to corotate together; and an intermediate piston between the brake and the clutch selectively movable to engage the brake or the clutch; and a controller having processing and memory architecture configured to execute control logic to control the auxiliary differential mechanism to effect different modes of operation, including:

an anti-slip modulation mode in which either the brake is modulated and the clutch is engaged, the clutch is modulated, or both the brake and the clutch are modulated; and a partial free wheel drive mode in which the brake is engaged and the clutch is disengaged.

16. The slip control system of claim 15, wherein the auxiliary differential mechanism includes a first clutch spring configured to apply a spring force to bias the intermediate piston toward the clutch and away from the brake, and wherein the brake is engaged to ground the main shaft when the brake piston, the intermediate piston, or both the brake piston and the intermediate piston engage the brake, and the brake is disengaged to allow the main shaft to rotate when neither the brake piston nor the intermediate piston engage the brake.

17. The slip control system of claim 16, wherein the auxiliary differential mechanism includes a second clutch spring configured to apply a spring force to bias the clutch piston toward the clutch; and wherein the clutch is engaged to tie the wheel shaft to the main shaft to corotate together when both the clutch piston and the intermediate piston engage the clutch, and the clutch is disengaged to allow the wheel shaft to rotate freely relative to the main shaft when the intermediate piston overcomes the spring force of the first clutch spring and moves away from the clutch.

18. The slip control system of claim 15, further including a hydraulic system having a control valve controlled by the controller to selectively supply hydraulic fluid to the auxiliary differential mechanism;

wherein the brake is engaged by the brake piston, the intermediate piston, or both by hydraulic pressure from the hydraulic system.

19. The slip control system of claim 18, wherein the clutch is engaged by the clutch piston by spring force.

20. The slip control system of claim 15, wherein the auxiliary differential mechanism includes a differential locking clutch configured to selectively tie the main shaft to a rotating member of the differential to corotate together;

wherein the controller executes the control logic to control the auxiliary differential mechanism to effect:

an unlocked drive mode in which the differential locking clutch is disengaged and the clutch is engaged; and a locked drive mode in which the differential locking clutch and the clutch are engaged; and wherein the controller executes the control logic to perform braking of the work vehicle in which:

the brake is engaged during an unlocked brake mode; and the differential locking clutch is engaged during a partial free wheel brake mode in which the differential locking clutch is engaged.

* * * * *